Patented Sept. 22, 1925.

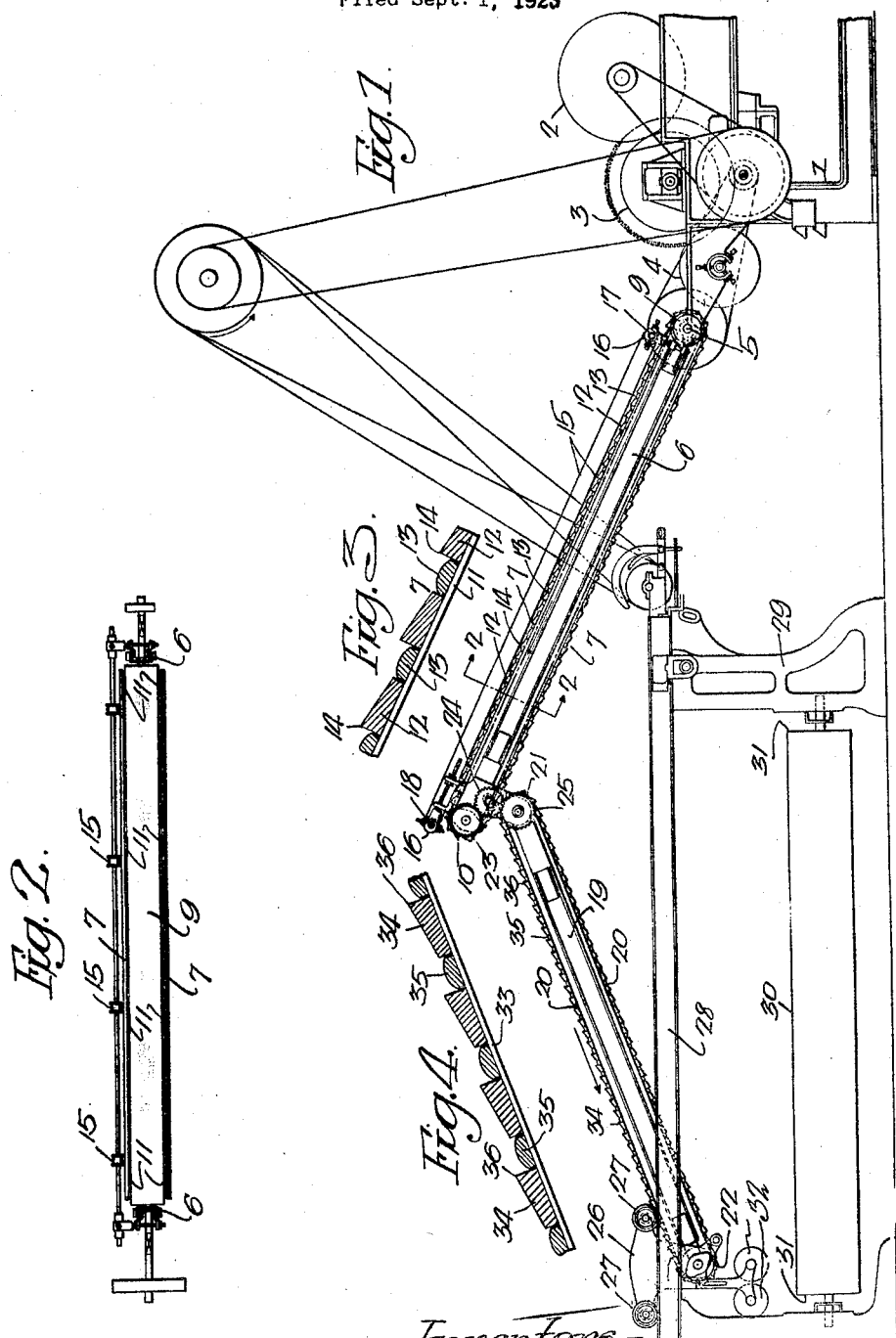

1,554,838

UNITED STATES PATENT OFFICE.

WILLIAM F. BOKUM AND JOHN H. SENIOR, OF PHILADELPHIA, PENNSYLVANIA, ASSIGNORS TO PROCTOR & SCHWARTZ, INCORPORATED, OF PHILADELPHIA, PENNSYLVANIA, A CORPORATION OF PENNSYLVANIA.

CAMEL-BACK LAPPING MACHINE.

Application filed September 1, 1923. Serial No. 660,584.

*To all whom it may concern:*

Be it known that we, WILLIAM F. BOKUM and JOHN H. SENIOR, citizens of the United States, residing in Philadelphia, Pennsylvania, have invented certain Improvements in Camel-Back Lapping Machines, of which the following is a specification.

One object of our invention is to improve the construction of camelback feeders for lapping machines so that the cotton can be carried up at an acute angle without being held to the conveyer by tapes and can be carried down at an acute angle without the liability of the cotton slipping on the conveyer.

A further object of the invention is to design the slats so that they will guide the material positively.

A still further object of the invention is to prevent the cotton being caught in the joints of the conveyer.

These objects we attain in the following manner, reference being had to the accompanying drawings, in which:

Fig. 1 is a side view of a camelback lapping machine, illustrating our invention;

Fig. 2 is a sectional view on the line 2—2, Fig. 1;

Fig. 3 is a detached sectional view drawn to an enlarged scale, showing the construction of the apron or conveyer for elevating the cotton; and Fig. 4 is a view showing the construction of the apron, or conveyer for carrying the cotton down onto the lapping mechanism.

Referring to the drawings, 1 is a frame of a Garnett machine. 2 is the main cylinder of the machine. 3 and 4 are the delivery cylinders, which are driven in the ordinary manner. Pivoted at 5 to the frame 1 is a frame 6, carrying the endless apron, or conveyer, 7. This apron passes around a drum 9 at the lower end, which is driven from the mechanism of the Garnett machine and there is a drum 10 at the upper end of the frame 6. The apron 7 consists of a series of endless belts 11 to which are secured the slats 12 and 13, shown clearly in Fig. 3. The slats 12 are higher than the slats 13 and each slat has a beveled face terminating at one side in a comparatively sharp edge 14, the slats which simulate teeth and which engage the cotton as it comes from the Garnett machine. The faces of the slats 13 are slightly rounded, as shown. The slats are placed close together and are of such a width that they pass readily around the drums 9 and 10.

In the present instance, a series of endless bands is located above the apron, or conveyer, 7. These bands pass around flanged pulleys 16 on shafts 17 and 18 and are used as a precautionary measure to hold the cotton on the apron when the frame 6 is at an acute angle. These bands may be omitted without detracting from the desired results.

Pivoted to the outer end of the conveyer frame 6 is a conveyer frame 19, on which is an endless conveyer 20, which passes around drums 21 and 22. The drum 21 is driven through gearing 23, 24 and 25 from the drum 10. The lower drum 22 is mounted on a carriage 26 having wheels 27 pivoted to rails 28 on the frame 29, having bearings for the drum 31 around which the apron 30 passes on which the batt is made up on the reciprocation of the carriage 26. The endless apron, or conveyer, 20 carries the material onto the distributing rolls 32 on the carriage and the film of cotton is spread onto the apron 30. The apron, or conveyer, 20 consists of a series of endless belts 33 to which are attached slats 34 and 35. The slats 34 are higher than the slats 35 and have beveled faces terminating at one side in sharp edges 36, which engage the cotton and prevent it sliding over the apron, or conveyer, when the apron is at an acute angle. The slats 35 are rounded in the same manner as the slats 13 of the apron 7.

Heretofore, lapping machines were provided with a single belt, which was adapted to the two frames. The belt was made of canvas and cross bars were secured to the canvas at a considerable distance apart in order to allow the conveyer to pass around the drums. The cotton had to be held onto the conveyer by tapes. This is objectionable, as the cotton has a tendency to catch in the joints between the cross bars and the belts. The cotton also had a tendency to slide over the conveyer.

In our invention, the slats are arranged close together and the cotton is carried positively by the first conveyer and is discharged onto the second conveyer, which carries it down to the folding machine without the use of bands or tapes.

We claim:

1. The combination in a camelback lapping machine, of two frames pivotally connected; a fixed pivot for the first frame, a carrier to which the second frame is pivoted; a single endless conveyer on each frame, the conveyer on the first frame having slats shaped to convey and hold the material as it is carried upwards, and the single conveyer on the second frame having slats, which are shaped to prevent slipping of the material as it is conveyed downwards; means for feeding material to the first conveyer; and means for receiving material from the second conveyer.

2. The combination in a camelback lapping machine, of two frames pivotally connected, one end of one frame being pivoted at a fixed point; a carriage on which one end of the other frame is pivoted; an endless conveyer on each frame, the conveyer of the first frame being composed of a series of slats having beveled faces terminating in sharp edges which hold the material as it is carried upwards; the conveyer of the second frame having slats similar to those of the first conveyer, but arranged in a reverse direction to prevent slippage of the material as it is conveyed down the second frame to the carriage.

3. A conveying apron of a camelback lapping machine, consisting of a series of belts spaced apart; and two series of slats mounted alternately on the belts, the slats of one series being higher than those of the other series and having beveled faces terminating at the high side in a sharp edge to engage material, the faces of the other slats being rounded.

WILLIAM F. BOKUM.
JOHN H. SENIOR.